United States Patent [19]

Barrett et al.

[11] 4,227,159
[45] Oct. 7, 1980

[54] COMMON-RESONATOR PRE-LOCKED LASER

[75] Inventors: Joseph J. Barrett, Morris Plains; Otis G. Peterson, Dover, both of N.J.

[73] Assignee: Allied Chemical Corporation, Morris Township, Morris County, N.J.

[21] Appl. No.: 871,913

[22] Filed: Jan. 24, 1978

[51] Int. Cl.² .............................................. H01S 3/091
[52] U.S. Cl. .......................... 331/94.5 P; 331/94.5 C
[58] Field of Search ................... 331/94.5 C, 94.5 Q, 331/94.5 P

[56] References Cited

U.S. PATENT DOCUMENTS 3,319,182  5/1967  Aagard .......................... 331/94.5 Q

OTHER PUBLICATIONS

Pinard et al., A Frequency Locked, Single Mode Pulsed Dye Laser, Application to Single Frequency Tunable U.V. Generation.
Optics Communications, vol. 20, No. 3 (Mar. 1977), pp. 344-346.

Primary Examiner—William L. Sikes
Attorney, Agent, or Firm—Gerhard H. Fuchs; Horst M. Kasper; James Riesenfeld

[57] ABSTRACT

A common-resonator pre-locked laser is formed by a jet stream dye pumped simultaneously by a CW laser and a pulsed laser. Laser pulses with greater than 100 W peak power in a band width of less than about 54 MHz are produced.

27 Claims, 4 Drawing Figures

COMMON-RESONATOR PRE-LOCKED LASER

FIELD OF THE INVENTION

This invention relates to a common resonator pre-locked laser.

BACKGROUND OF THE INVENTION

It is possible to obtain a much higher effective power gain from a laser amplifier by employing optical feedback with a cavity. The output of the amplifier can be controlled by injection of suitably tailored laser light into a cavity which resonates at the frequency of the injected light.

L. E. Erickson et al. report in *Appl. Phys. Lett.* 18, pages 433435 (1971) the spectral narrowing of dye laser output by injection of monochromatic radiation. The basic principles of laser injection locking are discussed by C. J. Buczek et al. in *Proceedings of the IEEE*, October 1973, pages 1411–1431. Injection locking is a technique employed for controlling the wavelength of a high power oscillator. For example, a narrow band injected signal induces the high power laser to emit a similarly narrowed frequency spectrum.

Magyar et al. reported in *Appl. Phys. Letters* 20, pages 406–408 (1972) the operation of a forced flashlamp pulsed dye laser oscillator, where the injection source was a flash lamp pulsed dye laser of 0.01 nm band width.

J. T. Turner et al. show in *Applied Physics Letters* 27, pages 441–443 (1975) that the line width of a pulsed dye laser can be drastically reduced without losing the tunability by injection locking the pulsed laser to an electro-optically tuned CW laser. The band width obtained was about 0.01 nm.

Danielmeyer in U.S. Pat. No. 3,676,799 issued July 11, 1972 discloses arrangements for stabilizing the frequency of single frequency laser by employing an etalon within the laser cavity.

W. Ganiel et al. in *IEEE Journal of Quantum Electronics* Vol. QE12, pages 704–716 (1976) analyze the mechanism of injection locking in pulsed dye laser systems and S. Blit et al. describe in *Applied Physics* 12, page 69 (1974) a tunable, single mode, injection locked flashlamp pumped dye laser.

The spectral narrowing of a flashlamp pulsed, waveguide dye laser by amplification of tunable narrow band CW radiation is described by P. Burlamacchi et al. in *Optics Communications* 17, pages 6–10 (1977). A flashlamp pumped dye laser can be controlled with a relatively low amount of CW narrow band radiation.

Pinard et al. in *Optics Communications* 20, pages 344–346 (1977) describe a dye laser arrangement in which super-position of both CW and pulsed excitation generates a single mode pulsed tunable laser light beam. In this work only a small part of the power of the pulsed frequency doubled Nd:YAG laser is used to excite two amplifying dye cells.

Hutchinson et al. in U.S. Pat. No. 4,019,157 discloses high power gas lasers which are seeded by a beam from a low power laser.

The conventional technique of injection locking has suffered from the difficulty that the injected signal must be injected into the resonator in such a way that it does not interfere with extraction of the laser emission from the amplifier. In addition, feedback from the amplifier mirrors into the master oscillator must be eliminated by some type of optical isolator. If this is not done, the oscillator will try to oscillate on a resonator mode which is out of resonance with the amplifier cavity. This tendency for off-resonance operation complicates the tuning of the two lasers and greatly reduces the efficiency of operation. For peak performance, both in output intensity and wavelength control, the oscillator and amplifier resonator must be adjusted for perfect resonance. This means that the resonator lengths must be controlled to approximately 1 part in $10^7$.

The previous injection-locking schemes for obtaining a narrow spectral output from a pulsed dye laser were accomplished by injecting monochromatic radiation from a separate (oscillator) laser into the cavity of the pulsed dye (amplifier) laser. The frequency of the high power output of the amplifier laser is locked to the frequency of the oscillator laser and has the same narrow spectral width characteristics as the oscillator laser. For such injection-locking schemes, however, problems concerning (a) the matching of the resonant frequencies of the oscillator and amplifier, (b) optional feedback between the oscillator and amplifier, and (c) the manner in which laser radiation is injected and extracted from the amplifier laser cavity must be solved for each setup.

SUMMARY OF THE INVENTION

This invention is directed to a common resonator prelocked laser. An active medium means is placed in an optical resonator cavity. A first pumping means pumps the active medium means to produce a population inversion of optically excitable states suitable for generating stimulated emission of radiation. The radiation is selectively prepared with respect to its wavelength, spatial and/or temporal characteristics and adapted to the optical resonator. A second pumping means applies to the medium means pump radiation effective for generating strong laser radiation in the amplifying medium.

Alternatively, a common resonator pre-locked laser of the invention comprises an active medium placed in a resonator cavity and an optical pumping means for pumping said active medium. A switch means for the pumping means provides a first laser beam for producing a population inversion of optically excitable states in the active medium means for generating stimulated emission of radiation which is selectively prepared as to its wavelength, spatial and/or temporal characteristics. A second laser beam timely contiguous to the first beam provides pump radiation effective for generating strong laser radiation in the amplifying medium.

A method is disclosed for generating high power narrow band laser radiation. Radiation is injected from a first pumping means into a common cavity providing therein a lasing state. Then radiation from a second pumping means is injected into the common cavity for generating high power narrow band laser radiation at the frequency of the lasing state created by the first pumping means. The laser radiation is then decoupled from the common cavity.

DETAILED DESCRIPTION OF THE INVENTION

This invention discloses (1) a new injection-locking method which is simple to adjust with respect to (a) the matching of the resonant frequencies of the oscillator and amplifier, (b) optical feedback between the oscillator and amplifier, and (c) the manner in which laser radiation is injected and extracted from the amplifier laser cavity, which must be solved for each setup, and (2) apparatus which eliminates problems of the prior art. This invention combines a low power oscillator laser and a high power amplifier laser in the same optical cavity with a common gain medium. This is accomplished by pumping a jet stream dye laser simultaneously with a continuous wave (CW) argon ion (488 nm and 515 nm) laser and a pulsed, frequency-doubled, Nd:YAG (532.1 nm) laser. Normally, when a jet stream Rhodamine-6G dye laser is pumped by a double Nd:YAG laser, the laser light tends to have a broad band frequency spectrum. However, we have found that if the jet stream is pumped simultaneously by both a lower power CW argon ion laser and a moderately high peak power frequency doubled Nd:YAG laser, dye laser pulses can be obtained which have high peak power and narrow spectral linewidths. In accordance with the invention, linewidths between about 1 MHz and 100 MHz and peak powers of between about 0.1 kilowatts and 10 kilowatts are obtained. Conventionally, monochromatic radiation is injected from a separate (oscillator) laser into the cavity of the pulsed dye (amplifier) laser by employing low loss wavelength selective intra-resonator elements such as prisms, etalons, birefringent filters, etc. When the jet is pumped by the CW argon laser only, it is relatively easy to obtain a narrow spectral line from the dye laser by employing low loss wavelength selective intra-resonator elements such as prisms, etalons, birefringent filters, etc. By introducing the 532.1 nm radiation at the jet, the dye laser, which is running CW with a narrow linewidth, will tend to remain running with a narrow linewidth in the presence of the higher peak power 532.1 nm radiation. With the argon laser blocked, however, the dye laser output becomes very broad in frequency even with the previously mentioned intra-resonator tuning elements as indicated above, whereas with the dye jet pumped by the two lasers, the dye laser output has a narrow spectral linewidth. Compared to the situation when the locking laser radiation is provided by a second gain medium, the arrangement of a common cavity simplifies the adjustment and setup and increases the stability of the system.

The argon laser (all lines) is introduced into the laser cavity through a mirror which has high transmission at the argon laser wavelengths (470–530 nm) and high reflectance in the yellow and red wavelength region (560–650 nm). The 532.1 nm radiation from the Nd:YAG laser enters the laser cavity through one or more prisms. The temporal onset of the dye laser output pulse is earlier with respect to the pumping pulse with the CW argon beam present than when it is blocked. This is due to the fact that the dye laser is already above threshold at the initiation of the 532.1 nm pulse and the resonator already contains laser intensity at a level near the saturation value. The term pre-locking of a laser is defined herein as locking of a high power laser oscillator amplifier having within its resonator coherent light at the time it starts to amplify light, such coherent light having sufficient intensity to force the high powered device to faithfully amplify this selectively prepared initial laser light. The injection locking described in the prior art is a special case of pre-locking.

The common gain medium includes any active laser medium such as solid, liquid, and gas. Such medium possesses electronic or vibrational higher energy states suitable for generating a population inversion. Neutral atomic gases having such states include cesium, mercury, nitrogen, oxygen, iodine, helium, neon, argon, krypton, xenon and the like. Ionized atomic gases having such states include zinc, cadmium, argon, krypton, xenon and the like. Molecular gases having such states include hydrogen cyanide, carbon monoxide, carbon dioxide, hydrogen bromide, hydrogen chloride, water, and the like. Dye materials having such states include Rhodamine 6G, Rhodamine B, p,p'-diphenylstilbene, fluorescein, 4-methyl umbelliferone, Pyronium B and the like. Liquid materials having such states include three fold positive charged europium ($Eu^{3+}$) in benzoylacetone solution and like liquids.

Glasses having such states include optically stable glasses having incorporated rare earth ions such as neodymium, ytterbium, erbium and the like.

Solid crystals having such states include gallium arsenide, indium phosphide, gallium antimonide, indium arsenide, indium antimonide, lead sulfide, lead selenide, lead telluride, zinc sulfide, zinc oxide, zinc selenide, cadmium sulfide, cadmium selenide and the like and in their mixed crystals of the same crystal structure.

Insulating crystal lasers include materials wherein a host lattice incorporates ions having suitable energy states. Such hosts include aluminum oxide, erbium oxide, gadolinium oxide, lanthanum oxide, yttrium oxide, lanthanum oxysulfide, gadolinium gallium garnet, yttrium aluminum garnet, yttrium gallium garnet, yttrium aluminum oxide (perovskite type), barium fluoride, calcium fluoride, strontium fluoride, magnesium fluoride, manganese fluoride, zinc fluoride, cesium fluoride, lanthanum fluoride, lithium yttrium fluoride, calcium tungstate, strontium tungstate, sodium gadolinium tungstate, sodium lanthanum tungstate, calcium molybdate, sodium lanthanum molybdate, lead molybdate, strontium molybdate, gadolinium molybdate, potassium yttrium molybdate, lithium niobate, calcium niobate, lanthanum niobate, calcium vanadate, yttrium vanadate, calcium fluorophosphate, calcium yttrium silicate, barium magnesium germanate and the like. Ions having suitable energy states include chromium, nickel, neodymium, holmium, erbium, thulium, uranium and the like.

The common gain medium may be in separate sections, e.g., more than one dye volume can be employed. Preferably the common gain medium is capable of CW operation, such as rhodamine 6G dye.

The first pumping means optically pumps the gain medium. The first pumping means can be an incoherent or coherent light source. Coherent light sources include lasers having a gain medium such as those listed above. Incoherent sources include blackbody radiators, tungsten incandescent lamps, mercury lamps, xenon lamps, krypton lamps, alkali vapor lamps, non-wall stabilized arc lamps, sunlight, and pulsed sources such as xenon flashlamps, krypton flashlamps, pulsed alkali vapor lamps, shockwave generated discharge lamps, Z-pinch discharge lamps, ablating wall flash lamps and the like. A preferred first pumping means is an argon laser.

The first pumping means preferably provides between 0.5 and 5 Watts power. The second pumping means includes the same type of devices as the first pumping means; however, generally, the second pumping means has larger output.

A preferred second pumping means is a frequency doubled Q-switched Nd:YAG laser. The Q-switch is preferably of the acousto-optic modulator type. The second pumping means preferably provides a peak power of between about 50 Watts and 100 Megawatts. If first and second pumping means are both lasers, and preferably gas lasers, they can be located in the optical resonator.

This invention can be used to establish any of several well-defined laser output characteristics prior to amplification by high peak excitations. These characteristics include (1) wavelength tuning and linewidth control, (2) mode locking and pulse width adjustment, and (3) spatial (transverse mode) intensity distributions. Laser systems for which these single resonator techniques can be applied include (1) dye lasers with dual excitation of common or separate dye volumes using dyes which will operate CW, for example, rhodamine 6G, (2) molecular gas lasers which will operate both CW and pulsed; for example, $CO_2$ and CO with both a CW and pulsed excitation device contained within the same resonator, (3) solid state optically pumped lasers which can operate both CW and pulsed; for example, a $Nd^{3+}$ laser with a CW pumped Nd:YAG oscillator and a flash lamp pumped glass neodymium amplifier both contained within the same resonator, (4) diode lasers, particularly those with extended resonators for additional output control, for example, gallium aluminum arsenide, (5) mixed lasers where there is a fortuitous overlap of lasing wavelength; for example, (a) a CW diode laser with a common resonator dye laser amplifier, and (b) a CW dye laser with a ruby laser amplifier, and (6) parametrically combined lasers; e.g., establishing the idler frequency in a parametric oscillator with a CW dye laser before pumping the device with a pulsed Nd laser.

This invention has been demonstrated using a CW master oscillator dye laser, incorporating fine wavelength control for narrow band operation, to lock the wavelength of a pulsed dye laser pumped by a Q-switched (frequency doubled) Nd:YAG laser. The resulting laser output consists of high peak power, narrow band pulses.

Since both excitation sources are lasers, it can be seen that this arrangement alleviates most of the problems of the prior art by combining both functions within the same resonator and by focusing the two excited lasers into the same dye volume. The CW operation can be easily controlled by low loss intra-cavity tuning elements which would not have sufficient discrimination to tune the pulsed emission. Therefore the locked emission of the pulsed output is greater than normally expected because the laser is less lossy and therefore more efficient.

The excitation volume of the combination laser is fixed in size by the requirements for CW operation. This volume is much smaller than the optimum for pulsed operation alone. Such a small volume usually causes two deleterious effects on pulsed operation. First, the laser gain would be too high in the early part of the laser pulse, thereby allowing lasing to build up on many competing modes or wavelengths. Second, the high intensity excitation would bleach the ground state of the active dye and considerable excitation would be lost to second excited state absorption before the laser emission had had time to build up to an intensity high enough to drive the excited state down. Both of these effects are essentially eliminated by the existence of the injected signal in the resonator which is amplified nearly immediately to saturation flux intensities. This intensity sweeps out the energy in the excited state and thereby removes the unwanted transient effects of the tight focused system.

Figure 1:
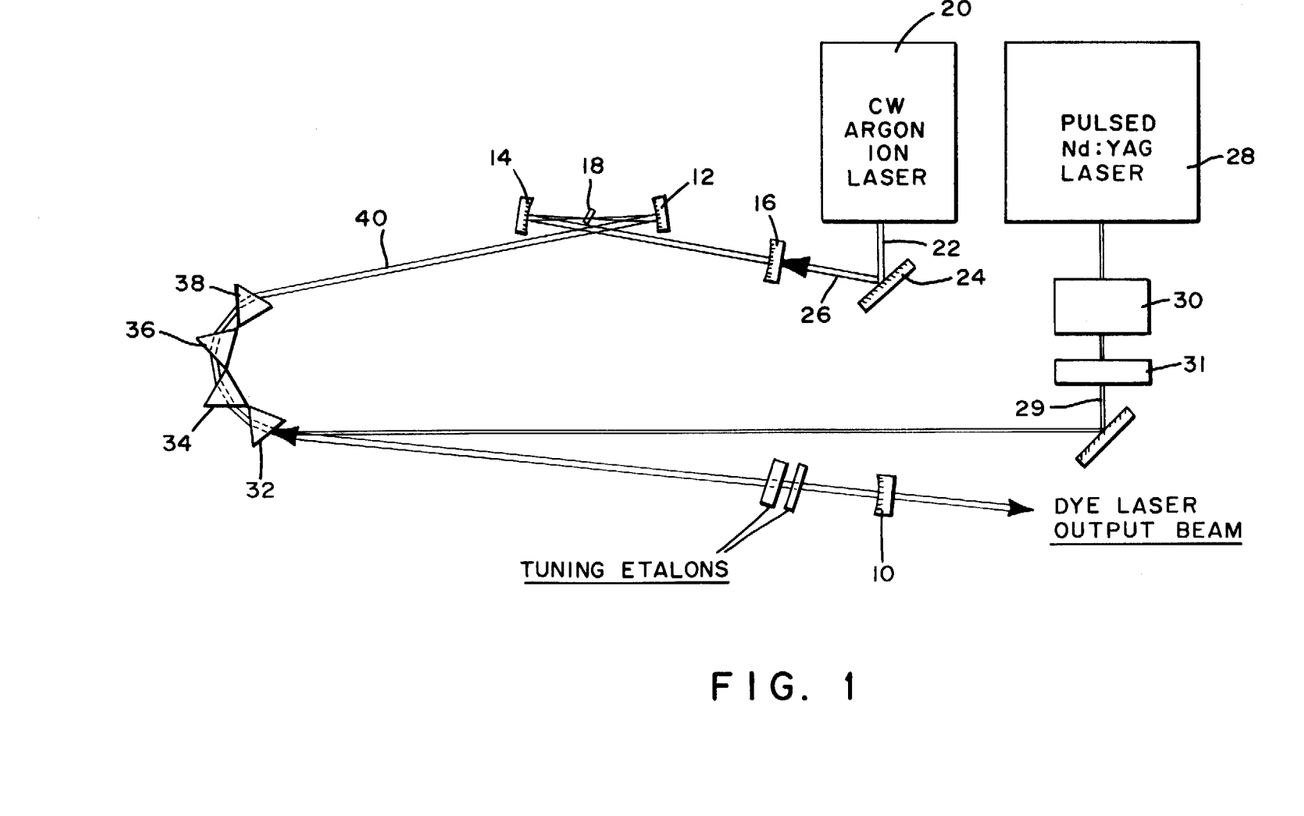
FIG. 1 shows a schematic plan view of an embodiment of the invention depicting a common resonator pre-locked dye laser.

The detailed experimental arrangement for the pulsed-CW common resonator dye laser is shown schematically in FIG. 1. The dye laser consisted of a folded four-mirror 10, 12, 14, 16 astigmatically compensated resonator cavity. The total length of the dye laser optical cavity between mirrors 10 and 16 was approximately 1.3 m. A free-flowing jet stream 18 of rhodamine 6G dye in ethylene glycol was pumped collinearly by the green and blue lines of an argon ion laser 20. The total power in the argon ion laser beam 22 was between one and two watts. The argon laser beam 22 was deflected by a mirror 24 and the beam 26 entered the dye laser cavity through a 5 m radius multilayer dielectric mirror 16 which had high transmissivity over the range 470–530 nm and high reflectivity over the range 560–650 nm. Mirrors 12 and 14 had radii of curvature of 5 cm and were separated by approximately 5 cm with an accuracy of better than 0.05 cm and had high reflectivity in the wavelength range of 560–650 nm. The laser beam diameter of the jet stream 18 was calculated to be about 33 micrometer. The dye laser output mirror 10 had a transmissivity of about 3 percent in the wavelength range 560–650 nm and a radius of curvature of 5 m.

A Nd:YAG laser assembly 28, which was pumped by two CW krypton-arc lamps (not shown), provided energy for the second pumping means. A fused silica acousto-optic Q switch 30 together with an intracavity $LiIO_3$ crystal 31 for frequency doubling produced 532.1 nm laser pulses at a repetition rate of about 4600 pulses/sec and with a pulse energy and peak power of $7.6 \times 10^{-5}$ J and 175 W, respectively. Four Brewster angle prisms 32, 34, 36, 38, were used to introduce the 532.1 nm laser beam 40 into the dye laser cavity.

This laser beam pumped collinearly the rhodamine 6G jet stream 18 in a direction opposite to that of the argon ion laser beam. The mirrors of the dye laser cavity were adjusted such that the pulsed and CW dye laser beams were spatially overlapped and the diameters of these beams were approximately equal. Under these conditions, the two laser beams illuminated the same volume of the dye jet and the peak power in the dye laser pulse for the pre-locked laser (532.1 nm pulsed plus CW argon ion laser excitation) was observed to be about fifty percent greater than that for pulsed excitation only. In addition, the temporal overlap between the dye laser pulse and the 532.1 nm laser pulse was better for the pre-locked laser than for the dye laser pumped only by the 532.1 nm laser pulse. When the dye laser was pumped only by the 532.1 nm laser pulse, the peak of the 532.1 nm laser pulse and the peak of the dye laser pulse were displaced by about 120 nsec, whereas, for 532.1 nm pulse and CW argon laser pumping, the peaks were displaced by approximately 60 nsec.

The pre-locked dye laser of the present invention was found to have very narrow spectral linewidths. Laser light of a narrow line width has many more applications than broad dye laser emission. For 532.1 nm pulsed excitation only, the dye laser operated in the vicinity of 577 nm over a broad spectral range of about 4 nm, corresponding to a frequency bandwidth of 3600 GHz (120 cm$^{-1}$). With the addition of the CW argon ion laser excitation, a very sharp intense line was observed at 577.2 nm. A spherical Fabry-Perot optical spectrum analyzer with a spectral range of 7.5 GHz and an instrumental bandwidth of 37.5 MHz was used to measure the linewidth of the injection-locked dye laser. The observed linewidth of the injection-locked dye laser as measured with this spectrum analyzer was 54 MHz, which corresponds to a $10^5$ increase in spectral brightness. The actual linewidth of the pre-locked dye laser is probably much less than 54 MHz, since this observed 54 MHz linewidth contains contributions due to the instrumental bandwidth of the spectrum analyzer and the frequency jitter produced by small fluctuations in the length of the dye laser cavity.

Alternatively, the two pumping means can be combined into one single pumping means for the common resonator if such pumping means is controllable as to its output intensity. The functions of the CW and pulsed pumping lasers are combined and then only a single laser is required to pump the dye jet. The first pumping means preferably has an intensity forming a ramp function with respect to time.

A ramp function is understood to be essentially monotonously increasing function until that point in time where a sudden change occurs. The second pumping means is contiguous in time with the first pumping means. By contiguous in time is understood that the second pumping means immediately follows or may overlap the first pumping means operation. A combined pumping means is accomplished by acousto-optic Q-switching of the frequency-doubled Nd:YAG laser in such a way as to produce a low power pulse of about a watt peak power for a duration of a few microseconds followed immediately by the full Q-switched pulse of peak power of about 200 W. The low power precursor pulse would excite the dye laser to operate in the oscillator mode and the main Q-switched pulse produces the pumping required for the amplifier mode.

Figure 2:
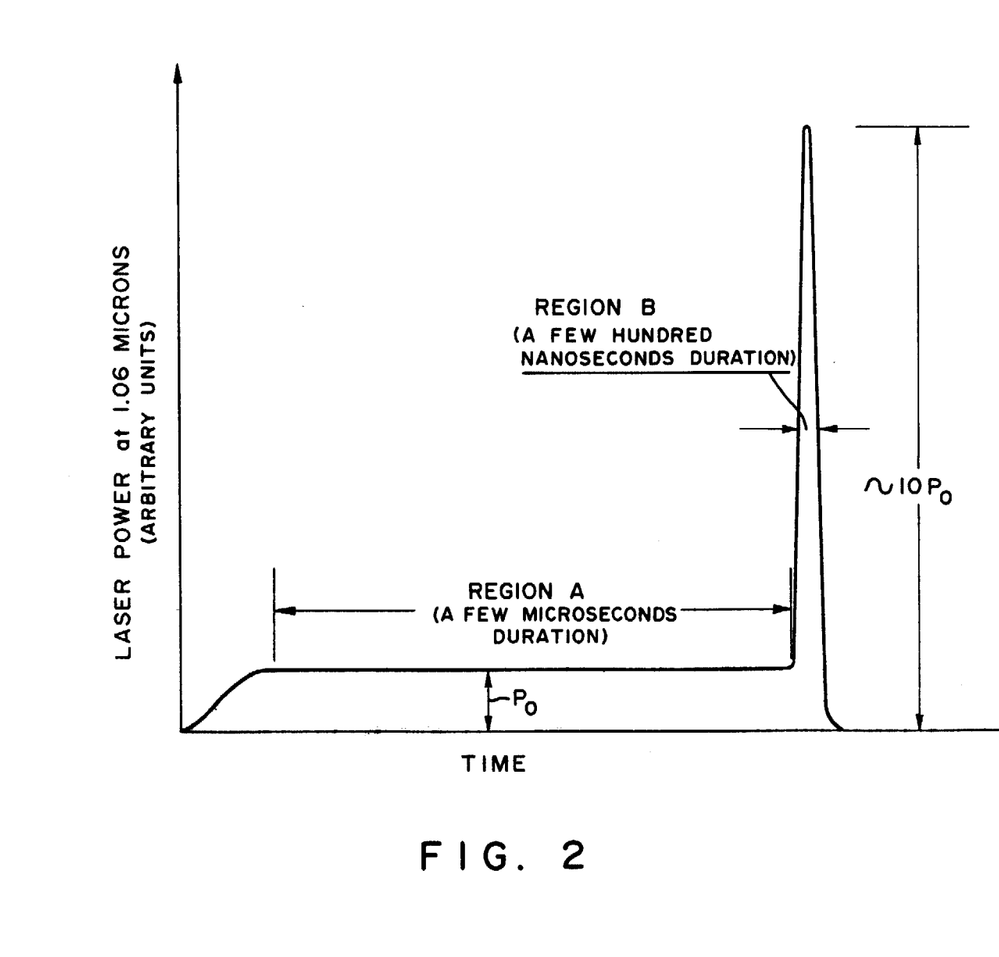
FIG. 2 shows a plot of applied laser intensity as a function of time.

Employing a single laser and a Q-switch simplifies the CW-pulsed pre-locked dye laser for commercial utilization. Single laser pumping, as discussed above, can be accomplished by using an acousto-optic Q-switched Nd:YAG laser, which is Q-switched in such a way that during the initial part of the laser pulse, the laser would oscillate at low power and at the end of the laser pulse, a high power pulse would occur. A schematic representation of this required pulse shape is shown in FIG. 2. The low power part of the pulse ($P_o$) would occur in Region A for a duration of a few microseconds and the high power part ($10.P_o$) of the pulse would occur in Region B and would last for a few hundred nanoseconds. By frequency doubling the 1.06 micrometer pulse to 0.532 micrometer, one would obtain a laser pulse at 0.532 micrometer with a 100:1 ratio in power between Regions B and A. Typical powers levels (at 0.532 micrometer) which should be obtainable are 1 watt in Region A and 100 watts in Region B. If a jetstream dye laser is pumped by such a source, it should be possible to have it oscillate at a single frequency in Region A, since in this region the pump power is low (1 watt) and sufficient time is available for a single frequency oscillation to build up. When the high power (100 W) pulse occurs (Region B), the dye laser will continue to oscillate in a single frequency but with proportionately higher power.

The acousto-optic Q-switch modulator consists of a block of fused silica with a transducer bonded to one face. Two parallel faces, adjacent to the surface on which the transducer is bonded, are optically polished and anti-reflection coated for the Nd:YAG laser wavelength of 1.06 micron. This fused silica block is positioned in the Nd:YAG laser cavity in an orientation such that the laser beam axis is approximately perpendicular to the polished faces of the block. When a radio-frequency (RF) voltage is applied to the transducer, an acoustic wave is launched in the fused silica block. This acoustic wave produces slight variations in the refractive index of the fused silica at the RF frequency which is typically of the order of 50 MHz. The periodic variations in the refractive index of the fused silica produces a transmission grating which diffracts energy out of the laser cavity, thereby lowering the Q of the laser cavity. While the RF voltage is on, laser oscillation is prevented and a large amount of energy is stored in the Nd:YAG rod. When the RF voltage is suddenly switched off, the Q of the laser cavity is increased abruptly, laser oscillation is possible and the energy that is stored in the Nd:YAG rod while the RF voltage was on is released in the form of the Q-switched laser pulse with high peak power (of the order of a kilowatt) and short pulse duration (of the order of $10^{-7}$ seconds).

In order to produce a low power precursor pulse before the main Q-switched pulse, a suitable electronic circuit is employed to modify the RF voltage amplitude in the time period (of a few microseconds) just before the RF voltage is switched off. For example, when the RF voltage amplitude was reduced slightly in a step fashion, a small low power Q-switched pulse was generated before the main Q-switched pulse. The peak power in the precursor Q-switched pulse is determined by the modulation depth of the RF voltage envelope. Since it is desirable to have the laser operate quasi-CW for a few microseconds duration before the main Q-switched pulse rather than with low power precursor Q-switched pulse, a different RF modulation scheme is employed. By gradually decreasing the RF amplitude with a ramp function rather than in a step fashion, laser oscillation which is quasi-CW can be generated as a precursor to the main Q-switched pulse. This embodiment of the invention is preferred over the locking with two pumping sources, since only one pumping laser is needed and the requirement for precise focusing of two independent lasers into the same volume of the jet stream has been removed.

Figure 3:
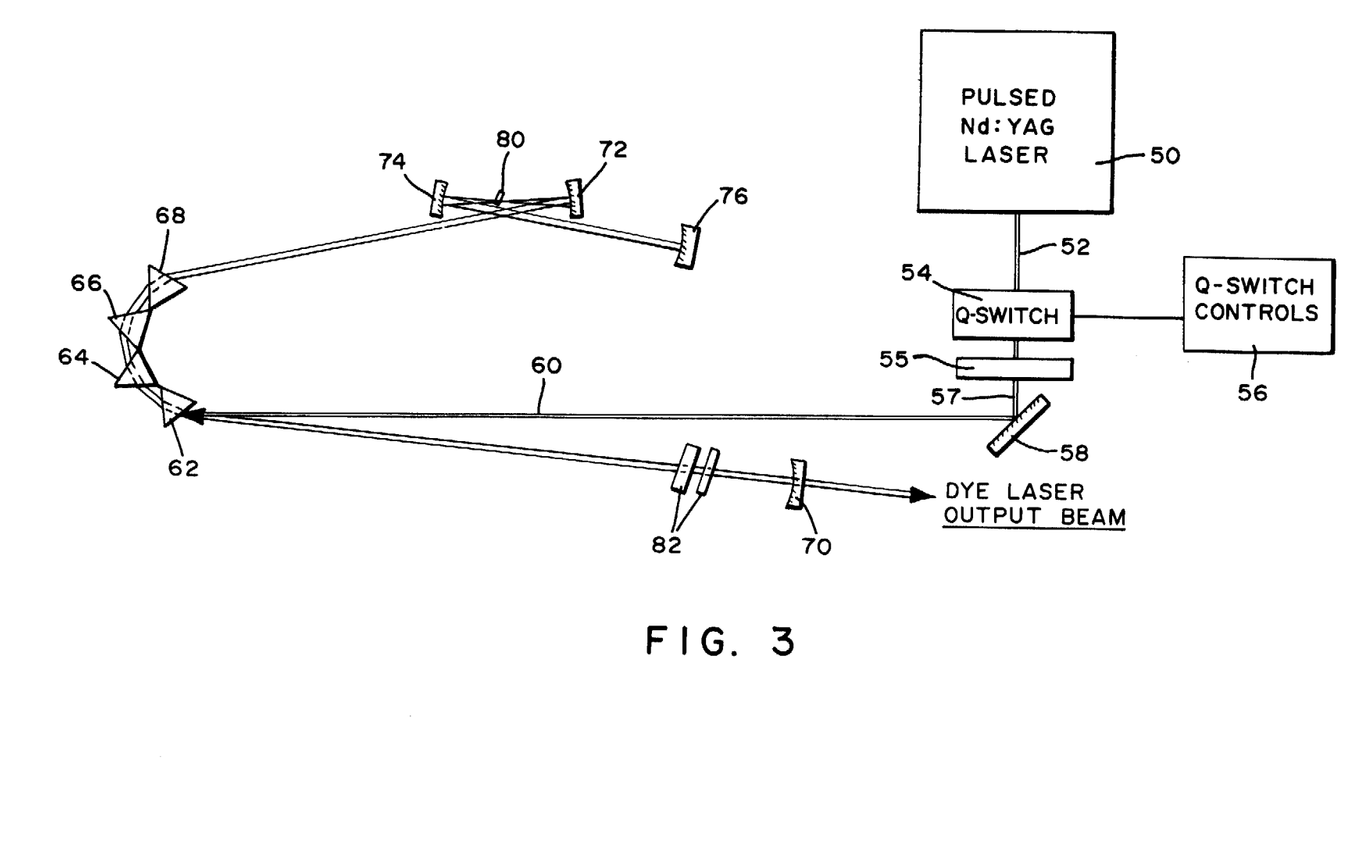
FIG. 3 shows a schematic plan view of an embodiment of the invention depicting a common resonator prelocked laser fed by Q-switched laser light.

Referring now to FIG. 3, there is shown a pulsed Nd:YAG laser 50 emitting a laser beam 52 which enters a Q-switch 54 and an intracavity LiIO$_3$ crystal frequency doubler 55. A Q-switch control 56 is connected to the Q-switch for providing by partial activation of the Q-switch a precurser pulse of between about 2 and 10 microseconds followed by a giant Q-switched laser pulse. The resulting pulse beam 57 is deflected by a mirror 58, and the deflected beam 60 enters via Brewster angle prisms 62, 64, 66, 68 a laser cavity between mirror 70 and 76. Two mirrors 72 and 74 focus the cavity beam to a dye jet 80. The pulse generates a population of excited states in the dye jet 80 and this produces a second dye laser pulse. The frequency of the second pulse can be tuned by tuning etalons 82. The dye laser output beam emerges through mirror 70 having a semi-transparent coating.

It has been found that the characteristics of the common resonator pre-locked dye laser can be calculated as set forth in the following equations.

To optimize the laser and to determine and calculate observed effects, it is necessary to mathematically model the laser kinetics. At any given point within the active amplifying region, one can write down the differential equations defining the different rate processes. The exciting radiation will be absorbed predominantly by the ground singlet state but also by the first excited singlet state and the lowest triplet state.

$$(dI_x/dx) = -I_x\sigma_{ox}n_o - I_x\sigma_{sx}n_s - I_x\sigma_{Tx}n_T \tag{1}$$

The laser emission will be amplified by the excited state population and absorbed by the lowest singlet and triplet states:

$$(dI_m/dx) = I_m\sigma_{sm}n_s - I_m\sigma_{Tm}n_T - I_m\sigma_{om}n_o \tag{2}$$

The excited singlet state is pumped by the excitation illumination and depleted by the laser action in addition to the intrinsic decay to the triplet and ground state.

$$(dn_s/dt) = I_x\sigma_{xo}n_o - I_m\sigma_{sm}n_s - k\sigma_{sT}n_s - n_s/\tau_s + I_m\sigma_{om}n_o \tag{3}$$

The triplet level feeds on the excited singlet level and decays by collisional quenching.

$$(dn_T/dt) = n_s k_{sT} - n_T/\tau_T \tag{4}$$

Finally, there must be a conservation of molecules:

$$n = n_o + n_s + n_T \tag{5}$$

In these equations, the intensity, I, is in units of photons per cross-sectional area per second; the molecule density n, are in units of molecules per unit volume; the stimulated cross sections, $\sigma_{ij}$, are Napernian coefficients in units of area; the excited lifetimes, $\tau_i$, in seconds and the intersystem crossing rate, $k_{st}$, in inverse seconds. The intensity subscripts represent excitation, x, and emission, m, intensities. The molecule number densities are distinguished by subscripts for ground state, o; excited singlet state, s; lowest triplet state, T; and no subscript for the total density. The lifetimes are labelled by state and the cross-sections have double indices to identify the state to which they are associated and the wavelength at which they are to be evaluated as determined by either the emission or excitation intensity. It must be noted that of the two cross-sections associated with the excited singlet state, the one at the excitation intensity wavelength, $\sigma_{xs}$, is for stimulated absorption and the other at the emission intensity wavelength, $\sigma_{ms}$, is for stimulated emission.

Laser operation in the time regime around 100 ns is dominated by the relationship between the excitation pulse width and the round trip time for light contained within the resonator. The limitation on the number of round trips imposed by the short excitation pulses necessitates producing high gains in the active media. The high gain requires large population densities of excited states. These, in turn, make the excited state absorption very important for efficiency considerations.

For most calculations in this time regime, the triplet population can be assumed to be zero or at worst a pertubation on a zero triplet calculation. Additionally, the excitation used to obtain such short pulses is the monochromatic output from other lasers. It can be assumed, therefore, that the excitation and dye absorption will be appropriately matched in wavelength so that excessive dye concentrations will not be required to absorb the excitation. This assumption permits an additional simplification, i.e., neglecting the ground state absorption of the laser emission.

The kinetic equations for the short pulse approximation can be easily obtained from equations 1 through 5.

$$(dI_x/dx) = -I_x[\sigma_{ox}n + (\sigma_{sx} - \sigma_{ox})n_s]$$

$$(dI_m/dx) = I_m\sigma_{sm}n_s \tag{6}$$

$$\frac{dn_s}{dt} = I_x\sigma_{xo}n - (I_x\sigma_{xo} + I_m\sigma_{sm} + \frac{1}{\tau_s})n_s$$

A useful generalization is to convert the equations to unitless variables.

The intensities can be redefined in terms of saturation fluxes; the excited state population as a fraction of the total population, the time with reference to the fluorescence lifetime, and distance in terms of absorption lengths thus:

$$\Phi_x I_x/I_x(\text{sat}); I_x(\text{sat}) = (1/\sigma_{ox}\tau_s)$$

$$\Phi_m I_m/I_m(\text{sat}); I_m(\text{sat}) = (1/\sigma_{sm}\tau_s)$$

$$\beta = n_s/n \tag{7}$$

$$\tau = t/\tau_s \qquad a_x = \sigma_{ox}n$$

$$z_i = x_i\sigma_{sm}n \qquad a_m = \sigma_{sm}n$$

The equations then become:

$$\frac{d\phi_x}{dz_i} = -\phi_x[1 + (\frac{a_m}{a_x} - 1)]\frac{a_x}{a_m}$$

$$(d\Phi_m/dz_i) = \Phi_m\beta$$

$$(d\beta/d\tau) = \Phi_x - (\Phi_x + \Phi_m + 1)\beta$$

These equations do not include the resonator losses. Since these equations are usually solved by computer techniques, these losses can be included as simple fractional multipliers operating on $\Phi_m$. In developing the algorithm to solve these equations, it is useful to note that the transit time through the active media is the shortest time characteristic of the system. If this is used as the time unit, then the distance and time variable are separable for the purposes of the computer calculation.

The equations have been solved numerically for the special case representing the frequency-doubled Nd:YAG pumping laser. Since the excitation pulse is 200 ns in width and the CW laser was used for the low intensity excitation, the triplet state was included explicitly in the calculation. The effect of the triplet state was essentially that of an additional but constant loss during the pulse development.

Figure 4:
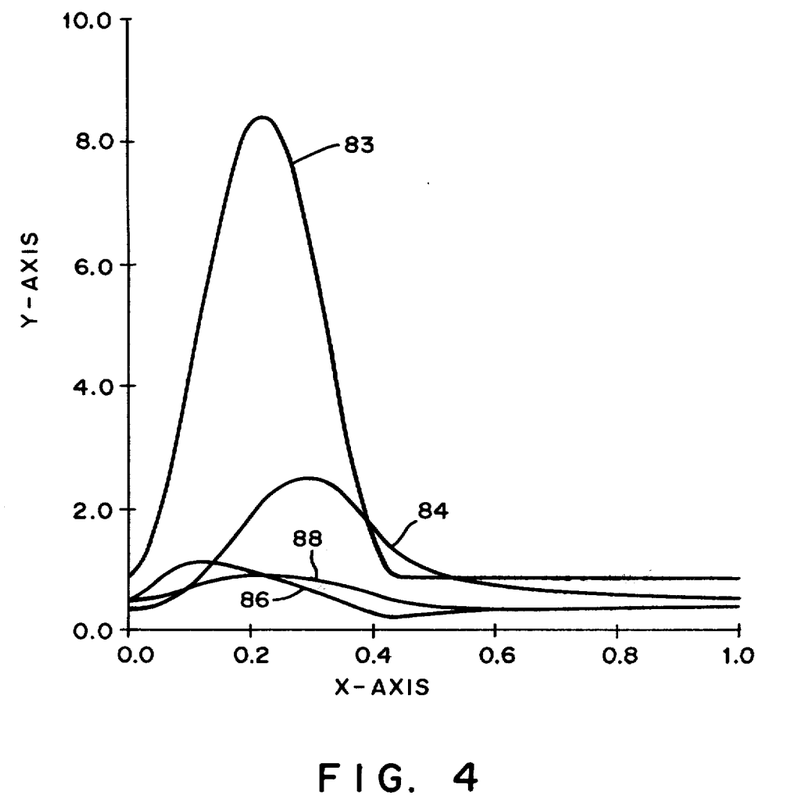
FIG. 4 shows a plot of the temporal characteristics of the pre-locked dye laser:
(a) for pulse excitation only and
(b) for pulse and CW excitation.

The model predictions are illustrated in FIG. 4. The curves show the dynamic relationships between the dye parameters as the pulse excites the dye. It is seen that the excited singlet state increases in response to the excitation pulse but starts to deplete as soon as the laser output begins to build up.

Correspondingly, the output starts to increase as the excited singlet population increases over the threshold value, thus making the resonator amplifying. The output stays high until it has driven the excited singlet well below the threshold value for amplification. The output thus lags the excitation in time but has approximately the same pulse width. The triplet population is seen to lag the singlet population but remains relatively constant.

In these calculations, the CW excitation is put into the system as a constant excitation additive to the pulse and the calculation started with an initial value for the excited state picked to correspond to this constant excitation. The correctness of the initial value choice is demonstrated by the return of the excited singlet to this value at the calculation end. In like manner, the injected signal is put into the calculation as an initial value which must also return to the same value at the finish.

FIG. 4 shows the comparison between the measured and calculated waveform for the laser output from a particular excitation pulse. Line 83 represents the incoming pulse and line 84 the output dye laser pulse. Line 86 represents the triplet excitation intensity of the dye and line 88 the singlet excitation. There is quite excellent agreement between the results calculated as set forth above and those obtained in the implementation of the invention. An optimum resonator configuration can be analytically calculated and its output characteristics can be predicted by employing the considerations and equations as set forth above.

We claim:

1. A common resonator pre-locked laser comprising an optical resonator resonant at a given wavelength; an active medium having an emission band coincident with said wavelength placed in the resonator; first pumping means for pumping the full extent of said active medium with relatively low power optical radiation within a corresponding absorption band of said active medium to produce a population inversion of optically excitable states within said emission band for generating stimulated emission of radiation; and second pumping means for pumping the full extent of said active medium with relatively high power optical radiation within said absorption band to generate strong laser radiation at said wavelength in the active medium;

said resonator including means for coupling radiation of said wavelength out of said resonator.

2. The common resonator pre-locked laser as set forth in claim 1 further comprising a Q-switch and wherein the first pumping means is provided by a pumping laser partially activated by the Q-switch; and wherein the second pumping means is provided by the pumping laser fuller activated by the Q-switch.

3. The common resonator pre-locked laser as set forth in claim 2 wherein the Q-switch is an acousto-optic modulator.

4. The common resonator pre-locked laser as set forth in claim 3 wherein said pumping laser is a frequency doubled Nd:YAG laser.

5. The common resonator pre-locked laser as set forth in claim 4 wherein the active medium comprises a first and a second section, said first section including a dye and second section including a ruby crystal.

6. The common resonator pre-locked laser as set forth in claim 1 wherein the active medium is a lasing dye included in at least one dye volume.

7. The common resonator pre-locked laser as set forth in claim 6 wherein said dye is included in more than one dye volume.

8. The common resonator pre-locked laser as set forth in claim 1 wherein the first pumping means is an argon laser.

9. The common resonator pre-locked laser as set forth in claim 1 wherein the second pumping means is a frequency doubled neodymium yttrium aluminum garnet laser.

10. The common resonator pre-locked laser as set forth in claim 1 including an etalon tuned to said wavelength, said etalon being located within said common resonator for suppressing oscillations at frequencies other than that of said given wavelength generated by the first pumping means.

11. The common resonator pre-locked laser as set forth in claim 1 wherein the active medium is a molecular gas.

12. The common resonator pre-locked laser as set forth in claim 1 wherein the active medium is a solid.

13. The common resonator pre-locked laser as set forth in claim 12 wherein the active medium comprises a first and second section, said first section including a Nd:YAG crystal and said second section including neodymium glass.

14. The common resonator pre-locked laser as set forth in claim 13 wherein the second pumping means is a flashlamp pulse.

15. The common resonator pre-locked laser as set forth in claim 1 wherein the active medium is formed by diodes.

16. The common resonator pre-locked laser as set forth in claim 15 wherein the active medium comprises a first and second section, said first section including a diode and said second section including a dye.

17. The common resonator pre-locked laser as set forth in claim 1 wherein two lasers are employed as first and second pumping means having a suitable overlap of lasing wavelength with the excited states of the active medium.

18. The common resonator pre-locked laser as set forth in claim 1 wherein the active medium comprises parametrically combined lasers.

19. The common resonator pre-locked laser as set forth in claim 1 wherein the first pumping means provides a peak power of between about 0.5 watts and 5 watts.

20. The common resonator pre-locked laser as set forth in claim 1 wherein the second pumping means provides a peak power of between about 50 watts and 100 megawatts.

21. The common resonator pre-locked laser as set forth in claim 1 wherein the stimulated emission of radiation generated by the first pumping means starts at least at a time which is threefold the pulse duration before the onset of the second pumping means power pulse.

22. A common resonator pre-locked laser comprising
(a) an optical resonator;
(b) an active medium placed in said optical resonator;
(c) a pumping laser for optically pumping said active medium, said pumping laser including a Q-switch to provide a pump beam having a relatively low power for a first time period and a substantially higher power for a second time period immediately following said first time period so as to produce a population inversion of optically excitable states in the active medium for generating stimulated emission of radiation of a given wavelength of low power during said first time period followed by a proportionately higher power emission of radiation at said wavelength during said second time period; and means for coupling said radiation out of said resonator.

23. The common resonator pre-locked laser as set forth in claim 22 wherein said first time period is between about 2 and 10 microseconds.

24. A method for generating high power narrow band laser radiation comprising
(a) injecting into an optical resonator, resonant at a given wavelength and containing an active medium having an emission band coincident with said wavelength, radiation from a first pumping means for pumping the full extent of said active medium with relatively low power optical radiation within a corresponding absorption band of said active medium to produce a population inversion of optically excitable states within said emission band for generating stimulated emission of radiation;
(b) injecting into said optical resonator radiation from a second pumping means for pumping the full extent of said active medium with relatively high power optical radiation within said absorption band to generate strong laser radiation at said wavelength in the active medium; and
(c) decoupling the radiation from said resonator.

25. The method as set forth in claim 24 wherein the first pumping means increases as a ramp function merging in time with the second pumping means.

26. The method as set forth in claim 24 wherein said first pumping means is a CW laser.

27. The method as set forth in claim 24 wherein the injected radiation from the first pumping means is laser radiation controlled by an acousto-optic modulator.

* * * * *